(12) United States Patent
Inokuchi

(10) Patent No.: US 10,538,639 B2
(45) Date of Patent: Jan. 21, 2020

(54) SILICONE PARTICLES AND METHOD FOR PRODUCING SAME

(71) Applicant: SHIN-ETSU CHEMICAL CO., LTD., Tokyo (JP)

(72) Inventor: Yoshinori Inokuchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/069,236

(22) PCT Filed: Mar. 13, 2017

(86) PCT No.: PCT/JP2017/009860
§ 371 (c)(1),
(2) Date: Jul. 11, 2018

(87) PCT Pub. No.: WO2017/163949
PCT Pub. Date: Sep. 28, 2017

(65) Prior Publication Data
US 2019/0016862 A1   Jan. 17, 2019

(30) Foreign Application Priority Data
Mar. 24, 2016   (JP) .................................. 2016-059346

(51) Int. Cl.
*C08J 7/04*   (2006.01)
*C08G 77/20*   (2006.01)

(52) U.S. Cl.
CPC ................ *C08J 7/04* (2013.01); *C08G 77/20* (2013.01); *C08J 2383/07* (2013.01)

(58) Field of Classification Search
CPC . C08J 7/04; C08J 3/12; C08J 2383/07; C08G 77/20; C08G 77/50; C08K 9/06; C08L 101/00
USPC ........................................................ 428/405
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,775,452 A | 11/1973 | Karstedt | |
| 5,538,793 A * | 7/1996 | Inokuchi | C08J 3/124 428/407 |
| 9,434,819 B2 * | 9/2016 | Inokuchi | C08J 7/18 |
| 9,439,840 B2 * | 9/2016 | Inokuchi | A61K 8/0245 |
| 9,498,422 B2 * | 11/2016 | Inokuchi | C08K 5/1545 |
| 9,616,254 B2 * | 4/2017 | Inokuchi | A61K 8/86 |

FOREIGN PATENT DOCUMENTS

| | | | |
|---|---|---|---|
| JP | 7-196815 | * | 8/1995 |
| JP | 7-196815 A | | 8/1995 |
| JP | 2000-226486 | * | 8/2000 |
| JP | 2000-226486 A | | 8/2000 |

OTHER PUBLICATIONS

International Search Report (PCT/ISA/210) issued in PCT/JP2017/009860, dated Jun. 6, 2017.
Written Opinion (PCT/ISA/237) issued in PCT/JP2017/009860, dated Jun. 6, 2017.
Office Action dated Mar. 19, 2019, in Japanese Patent Application No. 2016-059346, with English translation.
Extended European Search Report dated Oct. 21, 2019 for Application No. 17769993.1.

* cited by examiner

*Primary Examiner* — Alexandre F Ferre
(74) *Attorney, Agent, or Firm* — Birch, Stewart, Kolasch & Birch, LLP

(57) ABSTRACT

Provided are silicone particles having a rubber elasticity, a low cohesiveness, a high dispersibility in a resin, and alkenyl groups on the surfaces thereof; and a method for producing the same. The silicone particles are silicone elastomer spherical particles having surfaces thereof coated with polymethylalkenylsilsesquioxane, and having a volume average particle size of 0.1 to 100 μm, in which the polymethylalkenylsilsesquioxane is in an amount of 0.5 to 25 parts by mass per 100 parts by mass of the silicone elastomer spherical particles, and alkenylsilyl groups are present on the surface of the polymethylalkenylsilsesquioxane.

4 Claims, No Drawings

US 10,538,639 B2

SILICONE PARTICLES AND METHOD FOR PRODUCING SAME

TECHNICAL FIELD

The present invention relates to silicone particles as silicone elastomer spherical particles coated with polymethylalkenylsilsesquioxane and a method for producing the same.

BACKGROUND ART

Silicone elastomer particles having a rubber elasticity have been used as a stress relaxation agent for resins. For example, heat-curable resins such as an epoxy resin are used to package electronic and electric parts. In such case, silicone elastomer particles are added to the resin so as to prevent the package from being broken easily even when a stress has been applied thereto due to the expansion of the resin as the electric parts generate heat. However, the problems are that silicone elastomer particles have a high cohesiveness as well as a low dispersibility in a resin, which makes it impossible for these silicone elastomer particles to sufficiently endow the resin with a stress relaxation effect; and that the strength of the resin may be impaired due to the agglomerated silicone elastomer particles.

In order to solve the above problems, the inventor of the present invention have proposed a type of silicone particles as silicone rubber spherical fine particles coated with a polyorganosilsesquioxane resin (Patent document 1). This type of silicone particles are characterized by having a rubber elasticity, a low cohesiveness, and a high dispersibility in a resin. Particularly, a type of silicone particles employing polymethylsilsesquioxane as a polyorganosilsesquioxane exhibits the lowest cohesiveness and the highest dispersibility. Such a type of silicone particles are obtained by adding organotrialkoxysilane to an aqueous dispersion of silicone rubber spherical fine particles, and then hydrolyzing and condensing the organotrialkoxysilane under a given condition(s).

However, in a case where this type of silicone particles is added to a resin composing a product that requires a cutting step after molding e.g. a printed board as such product, there has been a problem that the silicone particles may fall off a cutting surface in the cutting step. Moreover, there has been a concern that failures may occur in a wiring step as a result of allowing the fallen silicone particles to adhere to the surface of the product.

Here, it is considered that the silicone particles will not fall off if an adhesiveness between a resin and the silicone particles is improved. Further, for this reason, it is considered that the surface of a polyorganosilsesquioxane may contain organic groups that are reactive with the resin. For example, if desiring to allow the polyorganosilsesquioxane to contain alkenyl groups, polyalkenylsilsesquioxane may simply be employed as a polyorganosilsesquioxane. However, there has been a problem that this type of silicone particles as silicone elastomer spherical particles coated with polyalkenylsilsesquioxane has a high cohesiveness and a low dispersibility in a resin.

As mentioned above, silicone particles coated with polymethylsilsesquioxane have a low cohesiveness and a high dispersibility. Thus, a lower cohesiveness and a higher dispersibility can be achieved, if employing polymethylalkenylsilsesquioxane by introducing a methylsilsesquioxane unit into polyalkenylsilsesquioxane. However, with the production method described in Patent document 1, it is not possible to produce polymethylalkenylsilsesquioxane having alkenyl groups on the surface thereof.

PRIOR ART DOCUMENT

Patent document
Patent document 1: JP-A-Hei-07-196815

SUMMARY OF THE INVENTION

Problem to be Solved by the Invention

Therefore, it is an object of the present invention to provide a type of silicone particles having a rubber elasticity, a low cohesiveness, a high dispersibility in a resin, and alkenyl groups on the surfaces of the particles; and a method for producing the same.

Means to Solve the Problem

The inventor of the present invention diligently conducted a series of studies to achieve the above objectives, and completed the invention as follows. That is, the inventor found that the following silicone particles were able to solve the aforementioned problems.

Specifically, the present invention is to provide the following silicone particles and a method for producing the same.

[1]
Silicone particles as silicone elastomer spherical particles having surfaces thereof coated with polymethylalkenylsilsesquioxane, and having a volume average particle size of 0.1 to 100 μm, wherein the polymethylalkenvlsilsesquioxane is in an amount of 0.5 to 25 parts by mass per 100 parts by mass of the silicone elastomer spherical particles, and alkenylsilyl groups are present on the surface of the polymethylalkenvlsilsesquioxane.

[2]
The silicone particles according to [1], wherein the alkenylsilyl groups present on the surface of the polymethylalkenylsilsesquioxane are in an amount of not smaller than 0.001 mol/100 g.

[3]
The silicone particles according to [1] or [2], wherein the polymethylalkenylsilsesquioxane is polymethylvinylsilsesquioxane.

[4]
A method for producing the silicone particles as set forth in any one of [1] to [3], comprising:
coating the surfaces of silicone elastomer spherical particles with polymethylalkenylsilsesquioxane, by hydrolyzing and condensing methyltrimethoxysilane and alkenyl trimethoxysilane under the presence of: water; the silicone elastomer spherical particles having a volume average particle size of 0.1 to 100 μm; an alkaline substance; and a cationic surfactant and/or a cationic water-soluble polymer.

[5]
The method for producing the silicone particles according to [4], wherein an amount of the cationic surfactant and/or the cationic water-soluble polymer used is 0.001 to 1 parts by mass per 100 parts by mass of water.

Effects of the Invention

The silicone particles of the present invention have a low cohesiveness and a high dispersibility, which contributes to a high stress relaxation effect of a resin. Further, since alkenyl groups are contained on the surfaces of the particles, an adhesiveness to a resin that is reactive with the alkenyl groups is improved, thereby making it possible to prevent the silicone particles from falling off when cutting the resin.

MODE FOR CARRYING OUT THE INVENTION

The present invention is described in greater detail hereunder.

Silicone Particles

The silicone particles of the present invention are those composed of silicone elastomer spherical particles; and polymethylalkenylsilsesquioxane covering the surfaces thereof. Alkenylsilyl groups are thus present on the surface of such polymethylalkenylsilsesquioxane.

Polymethylalkenylsilsesquioxane is in an amount of 0.5 to 25 parts by mass, preferably 1 to 15 parts by mass, per 100 parts by mass of the silicone elastomer spherical particles. When polymethylalkenylsilsesquioxane is in an amount of smaller than 0.5 parts by mass, the silicone particles will exhibit a higher cohesiveness, and thus a lower dispersibility. When polymethylalkenylsilsesquioxane is in an amount of larger than 25 parts by mass, the silicone particles will only impart a poor stress relaxation property to a resin.

(Silicone Elastomer Spherical Particles)

The volume average particle size of the silicone elastomer spherical particles used in the silicone particles of the invention is 0.1 to 100 μm, preferably 0.5 to 40 μm. When the volume average particle size of the silicone elastomer spherical particles is smaller than 0.1 μm, the silicone particles prepared therewith will exhibit a high cohesiveness, and not be easily dispersed as primary particles in a resin. Further, when the volume average particle size of the silicone elastomer spherical particles is larger than 100 μm, the silicone particles prepared therewith will impair the strength of a resin, and then prevent the resin from sufficiently exhibiting its stress relaxation effect.

Here, the volume average particle size of the silicone elastomer spherical particles is measured by a method appropriately selected from, for example, a microscopy method, a light scattering method, a laser diffraction method, a liquid phase precipitation method and an electric resistance method, in accordance with such particle size. Further, in this specification, the term "spherical" does not only refer to particles with true spherical shapes, but also includes particles with deformed ellipsoidal shapes each normally exhibiting an aspect ratio (longest axis length/shortest axis length) of 1 to 4, preferably 1 to 2, more preferably 1 to 1.6, and even more preferably 1 to 1.4, on average. The shapes of the particles can be confirmed by observing the particles with an optical microscope and/or an electronic microscope.

It is preferred that the silicone elastomer composing the silicone elastomer spherical particles be non-sticky. In addition, it is preferred that the rubber hardness of such silicone elastomer be 5 to 90, more preferably 20 to 70, when measured by a type A durometer described in JIS K 6253. When the rubber hardness of the silicone elastomer is lower than 5, the silicone particles obtained therewith will exhibit a high cohesiveness, and not be easily dispersed as primary particles in a resin. Further, when the rubber hardness of the silicone elastomer is greater than 90, the silicone particles obtained therewith may only impart an impaired stress relaxation effect to a resin. Particularly, the rubber hardness refers to a value obtained by measuring a test specimen having the shape and size specified in JIS K 6253, the test specimen being prepared using the composition of the silicone elastomer spherical particles.

The abovementioned silicone elastomer is, for example, a cured product having a linear organosiloxane block represented by $-(R^1{}_2SiO_{2/2})_n-$. Here, $R^1$ in this formula represents a substituted or unsubstituted monovalent hydrocarbon group having 1 to 30 carbon atoms, and n represents a positive number of 5 to 5,000.

In the above formula, examples of $R^1$ include alkyl groups such as a methyl group, an ethyl group, a propyl group, a butyl group, a pentyl group, a hexyl group, a heptyl group, an octyl group, a decyl group, a undecyl group, a dodecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group and a triacontyl group; aryl groups such as a phenyl group, a tolyl group and a naphthyl group; aralkyl groups such as a benzyl group and a phenethyl group; alkenyl groups such as a vinyl group and an allyl group; cycloalkyl groups such as a cyclopentyl group, a cyclohexyl group and a cycloheptyl group; and hydrocarbon groups obtained by substituting a part of or all the hydrogen atoms bonded to the carbon atoms in any of the aforementioned groups with atoms such as halogen atoms (e.g. fluorine atom, chlorine atom, bromine atom and iodine atom) and/or with substituent groups such as a acryloyloxy group, a methacryloyloxy group, an epoxy group, a glycidoxy group and a carboxyl group.

The abovementioned silicone elastomer is obtained from a curable liquid silicone. Curing in such case may take place by, for example, a condensation reaction of methoxysilyl groups ($\equiv$SiOCH$_3$) and hydroxysilyl groups ($\equiv$SiOH) or the like; a radical reaction of mercaptopropylsilyl groups ($\equiv$Si—C$_3$H$_6$SH) and vinvlsilyl groups ($\equiv$SiCH=CH$_2$); or an addition reaction of vinylsilyl groups ($\equiv$SiCH=CH$_2$) and hydrosilyl groups ($\equiv$SiH). Here, curing by addition reaction is preferred in terms of reactivity.

In the case of obtaining the silicone elastomer by curing via addition reaction, there may be employed any one of:

a combination of an organopolysiloxane having at least two monovalent olefinic unsaturated groups in one molecule and being represented by an average composition formula (1)

$$R^2{}_aR^3{}_bSiO_{(4-a-b)/2} \qquad (1)$$

and an organohydrogenpolysiloxane having at least three silicon atom (Si)-bonded hydrogen atoms (H) in one molecule and being represented by an average composition formula (2)

$$R^4{}_cH_dSiO_{(4-c-d)/2} \qquad (2)$$

and a combination of an organopolysiloxane having at least three monovalent olefinic unsaturated groups in one molecule and being represented by the average composition formula (I)

$$R^2{}_aR^3{}_bSiO_{(4-a-b)/2} \qquad (1)$$

and an organohydrogenpolysiloxane having at least two silicon atom-bonded hydrogen atoms in one molecule and being represented by the average composition formula (2)

$$R^4{}_cH_dSiO_{(4-c-d)/2} \qquad (2).$$

Further, with any one of the above combinations, prepared is a liquid silicone composition in which the organopolysiloxane having the monovalent olefinic unsaturated groups and the organohydrogenpolysiloxane are combined together at a ratio of 0.5 to 2 hydrosilyl groups per 1 monovalent olefinic unsaturated group. This liquid silicone composition is then subjected to an addition reaction under the presence of a platinum group metal-based catalyst.

Here, $R^2$ in the above formula represents a substituted or unsubstituted monovalent hydrocarbon group having 1 to 30 carbon atoms, except an aliphatic unsaturated group; and $R^3$ in the above formula represents a monovalent olefinic unsaturated group having 2 to 6 carbon atoms.

a and b represent positive numbers satisfying $0<a<3$, $0<b\leq3$, and $0.1\leq a+b\leq3$, preferably $0<a\leq2.295$, $0.005\leq b\leq2.3$, and $0.5\leq a+b\leq2.3$. $R^4$ represents a substituted or unsubstituted monovalent hydrocarbon group having 1 to 30 carbon atoms, except an aliphatic unsaturated group.

c and d represent positive numbers satisfying $0<c\leq3$, $0\leq d\leq3$, and $0.1\leq c+d\leq3$, preferably $0\leq c\leq2.295$, $0.005\leq d\leq2.3$, and $0.5\leq c+d\leq2.3$.

Examples of $R^2$ include alkyl groups such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group and a triacontyl group; aryl groups such as a phenyl group, a tolyl group and a naphthyl group; aralkyl groups such as a benzyl group and a phenethyl group; cycloalkyl groups such as a cyclopentyl group, a cyclohexyl group and a cycloheptyl group; and hydrocarbon groups obtained by substituting a part of or all the hydrogen atoms bonded to the carbon atoms in any of the aforementioned groups with atoms such as halogen atoms (e.g. fluorine atom, chlorine atom, bromine atom and iodine atom) and/or with substituent groups such as a acryloyloxy group, a methacryloyloxy group, an epoxy group, a glycidoxy group and a carboxyl group. Industrially, it is preferred that not less than 50 mol % of all the $R^2$ groups be methyl groups.

Examples of $R^3$ include a vinyl group, an allyl group, a butenyl group, a pentenyl group and a hexenyl group. Industrially, a vinyl group is preferred.

Examples of $R^4$ are the same as those listed as the examples of $R^2$.

It is preferred that the kinetic viscosity of the olefinic unsaturated group-containing organopolysiloxane and the organohydrogenpolysiloxane be 1 to 100,000 mm²/s, more preferably not higher than 10,000 mm²/s, at 25° C. This is because when such kinetic viscosity is greater than 100,000 mm²/s, it may be difficult to obtain narrowly distributed particles in a production method described later. Further, although the structure of the olefinic unsaturated group-containing organopolysiloxane and the organohydrogenpolysiloxane may be linear, circular or branched, it is particularly preferred that the structure be linear. Here, the kinetic viscosity is a value measured by an Ostwald viscometer.

One example of the olefinic unsaturated group-containing organopolysiloxane having a linear structure may be that represented by the following formula.

[Chemical formula 1]

(3)

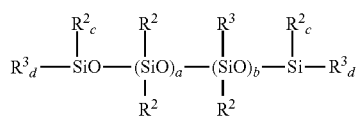

In the formula (3), $R^2$ and $R^3$ are defined as above in the formula (1). a represents an integer of 1 to 1,500, b represents 0 or an integer of 1 to 500, and each of c and d represents 0, 1, 2 or 3, provided that c+d=3, 2d+b≥2.

One example of the organohydrogenpolysiloxane having a linear structure may be that represented by the following formula.

[Chemical formula 2]

(4)

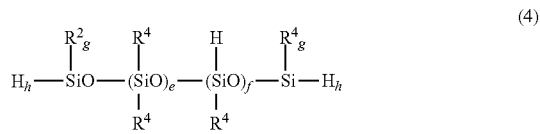

In the formula (4), $R^2$ and $R^1$ are defined as above in the formulae (1) and (2). e represents an integer of 1 to 1,500, f represents 0 or an integer of 1 to 500, and each of g and h represents 0, 1, 2 or 3, provided that g+h=3, 2h+f≥2.

As described above, in the case of obtaining the silicone elastomer by curing via addition reaction, it is required that the addition reaction be performed with the combination of the olefinic unsaturated group-containing organopolysiloxane having at least two monovalent olefinic unsaturated groups in one molecule and the organohydrogenpolysiloxane having at least three silicon atom-bonded hydrogen atoms; or with the combination of the olefinic unsaturated group-containing organopolysiloxane having at least three monovalent olefinic unsaturated groups in one molecule and the organohydrogenpolysiloxane having at least two silicon atom-bonded hydrogen atoms. The silicone elastomer obtained will exhibit stickiness if not employing these structures and combinations of polysiloxane.

As the platinum group metal-based catalyst used in these reactions, there may be listed known catalysts for use in hydrosilylation reaction. Specific examples of such catalysts include elemental platinum-group metals such as platinum (including platinum black), rhodium and palladium; platinum chlorides, chloroplatinic acids and chloroplatinic acid salts, such as $H_2PtCl_4 \cdot kH_2O$, $H_2PtCl_6 \cdot kH_2O$, $NaHPtCl_6 \cdot kH_2O$, $KHPtCl_6 \cdot kH_2O$, $Na_2PtCl_6 \cdot kH_2O$, $K_2PtCl_4 \cdot kH_2O$. $PtCl_4 \cdot kH_2O$, $PtCl_2$ and $Na_2HPtCl_4 \cdot kH_2O$ (provided that in the formulae, k represents an integer of 0 to 6, preferably 0 or 6); an alcohol-modified chloroplatinic acid (see specification of U.S. Pat. No. 3,220,972); a complex of chloroplatinic acid and olefin (see specifications of U.S. Pat. Nos. 3,159,601, 3,159,662 and 3,775,452); catalysts prepared by having a platinum-group metal such as platinum black and palladium supported on a support such as alumina, silica and carbon; rhodium-olefin complex; chlorotris (triphenylphosphine) rhodium (Wilkinson's catalyst); and a complex of a platinum chloride, chloroplatinic acid or chloroplatinic acid salt with vinyl group-containing siloxane, especially vinyl group-containing disiloxane or vinyl group-containing cyclic siloxane.

The amount of such platinum group metal-based catalyst added may be an effective amount as a hydrosilylation reaction catalyst, and is normally about 0.1 to 500 ppm, preferably about 0.5 to 200 ppm, more preferably about 0.1 to 100 ppm, in terms of the amount by mass of the platinum group-metal in the catalyst per the total amount of the curable liquid silicone composition.

The silicone elastomer spherical particles composing the silicone particles of the invention may also contain therein, for example, a silicone oil, organosilane, an inorganic powder and/or an organic powder.

The silicone elastomer spherical particles can be produced in the form of an aqueous dispersion, by a known method. For example, in the case of obtaining the silicone elastomer by curing via addition reaction, there may be employed, for example, a method where a surfactant and water is added to a liquid silicone composition composed of the olefinic unsaturated group-containing organopolysiloxane and the organohydrogenpolysiloxane to perform emulsification so as to prepare an emulsion, followed by adding a platinum group metal-based catalyst thereto to perform an addition reaction.

The surfactant used here is a non-ionic surfactant, a cationic surfactant or an amphoteric surfactant. An anionic surfactant inhibits the function of a cationic surfactant or cationic water-soluble polymer used in a later-described step of performing coating with polymethylalkenylsilsesquioxane, and may cause agglomeration by impairing the dispersibility of the silicone elastomer spherical particles when adding a cationic surfactant or a cationic water-soluble polymer.

Examples of the non-ionic surfactant used here include polyoxyethylene alkyl ether, polyoxyethylene polyoxypropylene alkyl ether, polyoxyethylene alkyl phenyl ether, polyethylene glycol fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, propylene glycol fatty acid ester, polyoxyethylene castor oil, polyoxyethylene hydrogenated castor oil, polyoxyethylene hydrogenated castor oil fatty acid ester, polyoxyethylene alkylamine, polyoxyethylene fatty acid amide, polyoxyethylene-modified organopolysiloxane and polyoxyethylene polyoxypropylene-modified organopolysiloxane.

Examples of the cationic surfactant include alkyltrimethyl ammonium salt, dialkyldimethyl ammonium salt, polyoxyethylene alkyl dimethyl ammonium salt, dipolyoxyethylene alkyl methyl ammonium salt, tripolyoxyethylene alkyl ammonium salt, alkylbenzyl dimethyl ammonium salt, alkyl pyridium salt, monoalkyl amine salt and monoalkyl amide amine salt.

Examples of the amphoteric surfactant include alkyldimethyl amine oxide, alkyldimethyl carboxy betaine, alkylamidepropyldimethyl carboxy betaine, alkyl hydroxy sulfobetaine and alkylcarboxymethylhydroxyethyl imidazolium betaine.

Any one kind of the above surfactants may be used singularly, or two or more kinds of them may be used in combination. However, a non-ionic surfactant is preferred since it is capable of emulsifying the liquid silicone composition even when used in a small amount, and thus yielding fine particles. If the surfactant(s) is used in a large amount, it will be difficult to perform coating with polymethylalkenylsilsesquioxane by a production method described later. It is preferred that the surfactant(s) be used in an amount of not larger than 20 parts by mass per 100 parts by mass of the liquid silicone composition. Further, since the liquid silicone composition cannot be easily turned into fine particles when the surfactant(s) is used in an amount of smaller than 0.01 parts by mass per 100 parts by mass of the liquid silicone composition, it is preferred that the surfactant(s) be used in an amount of 0.01 to 20 parts by mass, more preferably 0.05 to 5 parts by mass.

A general emulsification and dispersion machine may be used to perform emulsification. Examples of such general emulsification and dispersion machine include a high-speed rotary centrifugal radiating mixer such as a homodisper; a high-speed rotary shearing mixer such as a homomixer; a high-pressure injection-type emulsification and dispersion machine such as a homogenizer, a colloid mill; and an ultrasonic emulsifier.

If the platinum group metal-based catalyst exhibits a poor dispersibility to water, it is preferred that the platinum group metal-based catalyst be added to the emulsion after being dissolved in the surfactant in advance. As the surfactant, there may be listed those described above, and a non-ionic surfactant is particularly preferred.

The addition reaction may be performed at room temperature. However, if the reaction does not finish, it may also be performed under a heated condition at a temperature of lower than 100° C.

(Polymethylalkenylsilsesquioxane)

In the silicone particles of the invention, the polymethylalkenylsilsesquioxane covering the surfaces of the silicone elastomer spherical particles is in the form of particles. This can be confirmed by observing the surfaces of the silicone particles using an electronic microscope.

The polymethylalkenylsilsesquioxane is in an amount of 0.5 to 25 parts by mass, preferably 1 to 15 parts by mass, per 100 parts by mass of the silicone elastomer spherical particles. When the polymethylalkenylsilsesquioxane is in an amount of smaller than 0.5 parts by mass, the silicone particles will exhibit a higher cohesiveness, and thus a lower dispersibility. When the polymethylalkenylsilsesquioxane is in an amount of larger than 25 parts by mass, the silicone particles will only impart a poor stress relaxation property to a resin.

The polymethylalkenylsilsesquioxane is a resinous solid substance with methylsilsesquioxane units represented by a formula $CH_3SiO_{3/2}$ and alkenyl silsesquioxane units represented by a formula $R^5SiO_{3/2}$ being cross-linked together in a three-dimensional network state. In these formulae, $R^5$ represents an alkenyl group, preferably in this invention, an alkenyl group having 2 to 6 carbon atoms. Specific examples of such alkenyl group having 2 to 6 carbon atoms include a vinyl group, an allyl group, a 4-butenyl group, a 5-pentenyl group and a 6-hexenyl group, among which a vinyl group is particularly preferred.

In the present invention, it is preferred that a molar ratio between the methylsilsesquioxane units and the alkenyl silsesquioxane units be 99:1 to 10:90, more preferably 95:5 to 30:70. When the alkenyl silsesquioxane units are in a small amount, it will be difficult to obtain the polymethylalkenylsilsesquioxane having alkenylsilyl groups on the surface thereof. When the alkenyl silsesquioxane units are in a large amount, the silicone particles will exhibit a higher cohesiveness, and thus a lower dispersibility.

In the silicone particles of the present invention, the polymethylalkenylsilsesquioxane has alkenylsilyl groups on its surface. Even when the polymethylalkenylsilsesquioxane is composed of the methylsilsesquioxane units and the alkenyl silsesquioxane units, alkenylsilyl groups do not always exist on the surface thereof. If the structure is such that the surface of the polymethylalkenylsilsesquioxane is composed of the methylsilsesquioxane units, and the alkenyl silsesquioxane units exist inside the polymethylalkenylsilsesquioxane, it means that alkenylsilyl groups do not exist on the surface. Whether the alkenylsilyl groups are present on the surface of the polymethylalkenylsilsesquioxane can be confirmed by tests such as Hanus method and Wijs method for measuring iodine value. When the amount of the alkenylsilyl groups on the surface of the polymethylalkenylsilsesquioxane is small, an improvement in adhesion to a resin cannot be expected. Thus, it is preferred that the alkenylsilyl groups be in an amount of 0.001 mol/100 g to 0.05 mol/100 g. more preferably 0.003 mol/100 g to 0.02 mol/100 g. in the silicone particles.

Other than the methylsilsesquioxane units and the alkenyl silsesquioxane units, the polymethylalkenylsilsesquioxane may also contain at least one kind of $R^6SiO_{3/2}$ unit, $R^7_2SiO_{2/2}$ unit, $R^7_3SiO_{1/2}$ unit and $SiO_{4/2}$ unit, provided that properties such as non-cohesiveness and dispersibility of the silicone particles will not be impaired. $R^6$ in the above formulae represents a substituted or unsubstituted monovalent hydrocarbon group having 1 to 20 carbon atoms, except a methyl group and an alkenyl group. Examples of $R^6$ include alkyl groups such as an ethyl group, a propyl group, a butyl group, a pentyl group, a hexyl group, a heptyl group, an octyl group, a decyl group, a undecyl group, a dodecyl group, a tetradecyl group, a pentadecyl group, a hexadecyl group, a heptadecyl group, an octadecyl group, a nonadecyl group and an icosyl group; aryl groups such as a phenyl group, a tolyl group and a naphthyl group; aralkyl groups such as a benzyl group and a phenethyl group; cycloalkyl groups such as a cyclopentyl group, a cyclohexyl group and a cycloheptyl group; and hydrocarbon groups obtained by substituting a part of or all the hydrogen atoms bonded to the carbon atoms in any of the aforementioned groups with atoms such as halogen atoms (e.g. fluorine atom, chlorine atom, bromine atom and iodine atom) and/or with substituent groups such as an amino group, a acryloyloxy group, a methacryloyloxy group, an epoxy group, a glycidoxy group, a mercapto group and a carboxyl group. $R^1$ in the formulae represents a substituted or unsubstituted monovalent hydrocarbon group having 1 to 20 carbon atoms. Examples of $R^7$ include those listed as the examples of $R^6$; and a methyl group and an alkenyl group.

Method for Producing Silicone Particles

The silicone particles of the present invention is obtained by hydrolyzing and condensing methyltrimethoxysilane and alkenyl trimethoxysilane under the presence of water, silicone elastomer spherical particles having a volume average particle size of 0.1 to 100 μm, an alkaline substance, and a cationic surfactant and/or a cationic water-soluble polymer, followed by coating the surfaces of the silicone elastomer spherical particles with the polymethylalkenylsilsesquioxane.

(Silicone Elastomer Spherical Particles)

As the silicone elastomer spherical particles, there are used those having a volume average particle size of 0.1 to 100 μm e.g. those produced in the form of an aqueous dispersion as described above. If using the silicone elastomer spherical particles produced in the form of an aqueous dispersion, such aqueous dispersion can be used as it is, or water may be added thereto before use. Particularly, it is preferred that the silicone elastomer spherical particles be contained in the aqueous dispersion by an amount of 1 to 150 parts by mass, more preferably 5 to 70 parts by mass, per 100 parts by mass of water. When such amount contained is smaller than 1 part by mass, there will be observed a lower generation efficiency of the target silicone particles. When such amount contained is larger than 150 parts by mass, not only it will be difficult to coat the surfaces of the silicone elastomer spherical particles with polymethylalkenylsilsesquioxane resin, but the silicone elastomer spherical particles may aggregate and cohere as well.

(Cationic Surfactant and Cationic Water-Soluble Polymer)

A cationic surfactant and/or a cationic water-soluble polymer have a function of turning the structure of the surface of the polymethylalkenylsilsesquioxane for coating the surfaces of the silicone elastomer spherical particles into that having alkenylsilyl groups thereon. In a system where a cationic surfactant and/or a cationic water-soluble polymer do not exist, the structure of the polymethylalkenylsilsesquioxane obtained will not be that having alkenylsilyl groups on its surface if hydrolyzing and condensing methyltrimethoxysilane and alkenyl trimethoxysilane in a manner described later. In such case, it is assumed that the structure is such that the surface of the polymethylalkenylsilsesquioxane is composed of the methylsilsesquioxane units, whereas the alkenyl silsesquioxane units exist inside the polymethylalkenylsilsesquioxane.

As these cationic surfactant and/or cationic water-soluble polymer, one kind thereof may be used singularly, or two or more kinds thereof may be used in combination.

It is preferred that these cationic surfactant and/or cationic water-soluble polymer be added in an amount of 0.001 to 1 parts by mass, more preferably 0.005 to 0.5 parts by mass, per 100 parts by mass of water. When such amount added is smaller than 0.001 parts by mass, it will be difficult to achieve a structure having alkenyl groups on the surface of the polymethylalkenylsilsesquioxane. When such amount added is larger than 1 part by mass, it will be difficult for the surfaces of the silicone elastomer spherical particles to be coated with the polymethylalkenylsilsesquioxane.

There are no particular restrictions on a cationic surfactant, examples of which are the same as those listed above.

There are also no particular restrictions on a cationic water-soluble polymer, examples of which include a polymer of dimethyldiallylammonium chloride; a polymer of vinylimidazoline; a polymer of methylvinylimidazolium chloride; a polymer of ethyl acrylate trimethylammonium chloride; a polymer of ethyl methacrylate trimethylammonium chloride; a polymer of acrylamide propyl trimethylammonium chloride; a polymer of methacrylamide propyl trimethylammonium chloride; a polymer of epichlorohydrin/dimethylamine; a polymer of ethyleneimine; a quarternary product of a polymer of ethyleneimine; a polymer of allylamine hydrochloride; polylysine; a cationic starch; a cationized cellulose; chitosan; and derivatives of these polymers that are obtained by, for example, copolymerizing these polymers with monomers having non-ionic groups and/or anionic groups.

(Alkaline Substance)

An alkaline substance functions as a catalyst for a hydrolysis and condensation reaction of methyltrimethoxysilane and alkenyl trimethoxysilane. One kind of such alkaline substance may be used singularly, or two or more kinds thereof may be used in combination. An alkaline substance may be added as it is, or as an alkaline aqueous solution. It is preferred that such alkaline substance be added before adding methyltrimethoxysilane and alkenyl trimethoxysilane to an aqueous dispersion containing water, the silicone elastomer spherical particles, and the cationic surfactant or cationic water-soluble polymer. If an alkaline substance is added after adding methyltrimethoxysilane and alkenyl trimethoxysilane, the surfaces of the silicone elastomer spherical particles may not be coated with the polymethylalkenylsilsesquioxane.

The above alkaline substance is added in an amount at which pH of the aqueous dispersion containing water, the silicone elastomer spherical particles, the cationic surfactant and/or cationic water-soluble polymer, and such alkaline substance will fall into a range of preferably 10.0 to 13.0, more preferably 10.5 to 12.5. When such alkaline substance is added in an amount at which the abovementioned pH will fall into the range of 10.0 to 13.0, the hydrolysis and condensation reaction of methyltrimethoxysilane and alkenyl trimethoxysilane will progress in an especially sufficient manner, and the surfaces of the silicone elastomer spherical particles will be coated with the polymethylalkenylsilsesquioxane in an especially sufficient manner as well.

There are no particular restrictions on this alkaline substance. There may be employed, for example, alkali metal hydroxides such as potassium hydroxide, sodium hydroxide and lithium hydroxide; alkaline-earth metal hydroxides such as calcium hydroxide and barium hydroxide; alkali metal carbonates such as potassium carbonate and sodium carbonate; ammonia; tetraalkyl ammonium hydroxides such as tetramethylammonium hydroxide and tetraethyl ammonium hydroxide; or amines such as monomethylamine, monoethylamine, monopropylamine, monobutvlamine, monopentylamine, dimethylamine, diethylamine, trimethylamine, triethanolamine and ethylenediamine. Among these substances, ammonia is the most appropriate, because it can be easily eliminated from a powder of the silicone particles when volatized. As ammonia, there can be used a commercially available ammonia aqueous solution.

(Methyltrimethoxysilane and Alkenyl Trimethoxysilane)

Methyltrimethoxysilane is represented by a formula $CH_3Si(OCH_3)_3$; alkenyl trimethoxysilane is represented by a formula $R^5Si(OCH_3)_3$. In these formulae, $R^5$ represents an alkenyl group, preferably an alkenyl group having 2 to 6 carbon atoms in the present invention. Specific examples of $R^5$ include a vinyl group, an allyl group, a 4-butenyl group, a 5-pentenyl group and a 6-hexenyl group, among which a vinyl group is particularly preferred.

A molar ratio between methyltrimethoxysilane and alkenyl trimethoxysilane becomes the molar ratio between the methylsilsesquioxane units and the alkenyl silsesquioxane units in the polymethylalkenylsilsesquioxane generated by hydrolysis and condensation reaction. Thus, a preferable range of the ratio between the methyl trimethoxysilane and alkenyl trimethoxysilane is identical to that of the ratio between the methylsilsesquioxane units and the alkenyl silsesquioxane units in the polymethylalkenylsilsesquioxane, which is 99:1 to 10:90, more preferably 95:5 to 30:70.

If introducing into the polymethylalkenylsilsesquioxane at least one kind of the $R^6{}_2SiO_{3/2}$ unit, $R^7{}_2SiO_{2/2}$ unit, $R^7{}_3SiO_{1/2}$ unit and $SiO_{4/2}$ unit, there only has to be added at least one kind of $R^6{}_2Si(OR^7)_3$, $R^7{}_2Si(OR^8)_2$, $R^7{}_3SiOR^8$ and $Si(OR^8)_4$ that respectively correspond to these units. Here, $R^6$ and $R^7$ are defined as above. $R^8$ represents an unsubstituted monovalent hydrocarbon group having 1 to 6 carbon atoms. Examples of Re include a methyl group, an ethyl group, a propyl group, a butyl group, a pentyl group and a hexyl group, among which a methyl group is preferred in terms of reactivity.

Methyltrimethoxysilane and alkenyl trimethoxysilane are added in an amount at which the amount of the polymethylalkenylsilsesquioxane will fall into a range of 0.5 to 25 parts by mass, preferably 1 to 15 parts by mass, per 100 parts by mass of the silicone elastomer spherical particles.

(Hydrolysis and Condensation Reaction)

Methyltrimethoxysilane and alkenyl trimethoxysilane are added to an aqueous solution in which the silicone elastomer spherical particles are already dispersed, and in which the alkaline substance as well as the cationic surfactant and/or cationic water-soluble polymer are already dissolved, thereby causing hydrolysis and condensation reaction. The condensate i.e. polymethylalkenylsilsesquioxane will adhere to the surfaces of the silicone elastomer spherical particles, thus allowing the surfaces of the silicone elastomer spherical particles to be coated with polymethylalkenylsilsesquioxane.

It is preferred that methyltrimethoxysilane and alkenyl trimethoxysilane be added while performing stirring using a normal stirrer equipped with, for example, propeller blades and/or flat-plate blades. Although methyltrimethoxysilane and alkenyl trimethoxysilane may be added at one time, it is preferred that they be added over time. The drop time is 1 min to 3 hours, more preferably 10 min to 1 hour. Further, methyl trimethoxysilane and alkenyl trimethoxysilane may be mixed and melted together before being added, or may be added separately.

It is preferred that a temperature at that time be 0 to 60° C., more preferably 0 to 40° C. When such temperature is 0 to 60° C., the surfaces of the silicone elastomer spherical particles can be successfully coated with the polymethylalkenylsilsesquioxane.

Even after methyltrimethoxysilane and alkenyl trimethoxysilane were added, stirring will still be continued until the hydrolysis and condensation reaction of methyltrimethoxysilane and alkenyl trimethoxysilane has finished. In order to finish the hydrolysis and condensation reaction, the reaction may be performed at room temperature or a heating temperature of about 40 to 100° C.

(Powderization)

After the hydrolysis and condensation reaction, water is eliminated from the obtained aqueous dispersion of the silicone particles of the invention. Water elimination can, for example, be performed by heating the aqueous dispersion obtained after the above reaction, under a normal or reduced pressure. Specifically, it can be performed by, for example, a method where water is eliminated under a heated condition with the dispersion being positioned still; a method where water is eliminated while stirring and fluidizing the dispersion; a method where the dispersion is sprayed and thus dispersed in a hot air current as is the case with a spray dryer; or a method employing a fluid heat medium. Particularly, as a treatment prior to this operation, the dispersion may be concentrated by methods such as thermal dehydration, filtration separation, centrifugal separation and decantation, or the dispersion may also be washed by water or an alcohol if necessary.

If the products obtained by eliminating water from the aqueous dispersion that is obtained after the above reaction are agglomerated, the silicone particles can be obtained by crushing them with a crusher such as a jet mill, a ball mill or a hammer mill.

WORKING EXAMPLE

The present invention is described in greater detail hereunder with reference to working and comparative examples. However, the invention is not limited to these working examples. Particularly, in the examples, a kinetic viscosity refers to a value measured at 25° C.; "%" denoting a concentration and a content rate refers to "% by mass." Further, dispersibility was evaluated as follows.

Evaluation of Non-Cohesiveness (Measurement of Mesh Passing Amount)

A 60-mesh sieve, a 100-mesh sieve and a 200-mesh sieve were stacked in this order from the top, followed by weighing about 2 g of a particle sample on the 60-mesh sieve, and then using a powder characteristics tester (powder tester type: PT-E by Hosokawa Micron Group) to cause a vibration with an amplitude of 1 mm for 90 sec so as to then measure a passing amount with regard to each mesh. The mesh passing amount is expressed by %, and it is considered that the larger the passing amount, the higher the non-cohesiveness is.

Measurement of Vinyl Group Content

The particle sample is precisely weighed and put into a conical flask, followed by adding methanol thereto to disperse the particle sample. A Hanus reagent (acetic acid solution of iodine bromide) is then added, followed by performing stirring for an hour using a magnetic stirrer. After adding thereto an excessive volume of an aqueous potassium iodide solution, and then stirring them for a minute, titration is performed using a sodium thiosulfate aqueous solution. An iodine content that was not used in the reaction is then calculated based on the titration amount of the sodium thiosulfate. An iodine content that was used in the reaction is further calculated therefrom, such iodine content corresponding to a vinyl group content.

Working Example 1

Put into a 1 L glass beaker were 500 g of a methylvinylpolysiloxane that is represented by the following formula (5) and has a kinetic viscosity of 600 mm$^2$/s; and 20 g of a methylhydrogenpolysiloxane that is represented by the following formula (6) and has a kinetic viscosity of 27 mm$^2$ is (amounts at which 1.13 hydrosilyl groups would be present per one olefinic unsaturated group), followed by using a homomixer to stir and melt them at 2,000 rpm. Next, 3 g of a polyoxyethylene lauryl ether (adduct molar number of ethylene oxide=9 mol) and 65 g of water were added thereto, followed by using a homomixer to stir them at 6,000 rpm to obtain an oil-in-water type emulsion with an increased viscosity. There, stirring was further continued for 15 min. Next, as a result of adding water of 410 g while performing stirring at 2,000 rpm, a homogenous white emulsion was obtained. This emulsion was then moved to a 1 L glass flask equipped with a stirring device utilizing an anchor-shaped stirring blade(s), and subjected to a temperature control of 15 to 20° C. Next, while performing stirring, there was added a mixed melt of: 1 g of a toluene solution of a complex of chloroplatinic acid and a vinyl group-containing disiloxane (platinum content 0.5%); and 1 g of polyoxyethylene lauryl ether (adduct molar number of ethylene oxide=9 mol), followed by further performing stirring at the same temperature for 12 hours to obtain an aqueous dispersion of silicone elastomer particles.

[Chemical formula 3]

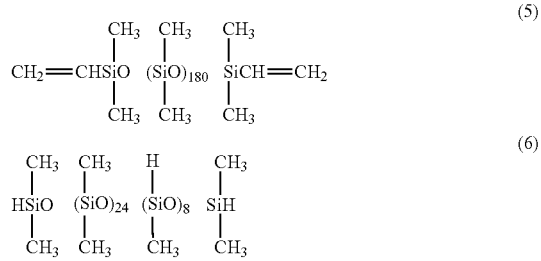

After using an optical microscope to observe the shapes of the silicone elastomer particles in the aqueous dispersion obtained, it was confirmed that they were in spherical shapes, and exhibited a volume average particle size of 5 μm when measured by an electric resistance-method particle size distribution measuring device (Multisizer 3 by Beckman Coulter, Inc.).

Further, the hardness of the silicone elastomer composing the silicone elastomer particles was measured as follows. The methylvinylpolysiloxane represented by the formula (5), the methylhydrogenpolysiloxane represented by the formula (6) and the toluene solution of the complex of chloroplatinic acid and the vinyl group-containing disiloxane (platinum content 0.5%), were mixed at the aforementioned compounding ratio, followed by pouring them into an aluminum petri dish in a way such that the mixture would reach a thickness of 10 mm. After being left at 25° C. for 24 hours, the mixture was then heated in a constant-temperature bath of 50° C. for an hour, thus obtaining a non-sticky silicone elastomer. The hardness of the silicone elastomer was 28 when measured by a type-A durometer as a hardness meter.

Next, 288 g of the obtained aqueous dispersion of the silicone elastomer spherical particles was moved to a 2 L glass flask equipped with a stirring device utilizing an anchor-shaped stirring blade(s), followed by adding thereto 672 g of water, 19 g of a 28% ammonia water, and 1 g of a 40% dimethyldiallylammonium chloride polymer aqueous solution (product name: ME polymer H40 W by TOHO Chemical Industry Co., Ltd.) (amount at which the dimethyldiallylammonium chloride polymer would be present in an amount of 0.05 parts by mass per 100 parts by mass of water). The liquid at that time exhibited a pH of 11.3. After being subjected to a temperature control of 5 to 10° C., 9.4 g of methyltrimethoxysilane and 10.2 g of vinyltrimethoxysilane (amounts at which polymethylvinylsilsesquioxane after hydrolysis and condensation reaction would be present in an amount of 6.7 parts by mass per 100 parts by mass of the silicone elastomer spherical particles; and molar ratio between methyltrimethoxysilane and vinyltrimethoxysilane is 50:50) were further delivered thereinto by drops over a period of 25 min. The liquid temperature was kept at 5 to 10° C. during such period, and stirring was then performed for another hour. Next, heating was performed until a temperature of 55 to 60° C. had been reached, and stirring was then performed for an hour while maintaining such temperature. In this way, the hydrolysis and condensation reaction of methyltrimethoxysilane and vinyltrimethoxysilane was completed.

The liquid prepared by hydrolyzing and condensing methyltrimethoxysilane in the aqueous dispersion was dehydrated to about 30% moisture content using a pressure filter. The dehydration product was then moved to a 2 L glass flask equipped with a stirring device utilizing an anchor-shaped stirring blade(s), followed by adding 1,000 g of water thereto, and then stirring them for 30 min before performing dehydration using a pressure filter. The dehydration product obtained was again moved to a 2 L glass flask equipped with a stirring device utilizing an anchor-shaped stirring blade(s), followed by adding 1,000 g of water thereto, and then stirring them for another 30 min before performing dehydration using a pressure filter. The dehydration product obtained was then dried at a temperature of 105° C. in a hot air-flow dryer, followed by using a jet mill to crush the dried product to obtain fluid silicone particles.

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

These silicone particles were observed with an electronic microscope, and it was confirmed that they were particles with the surfaces of the silicone elastomer spherical particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.006 mol/100 g.

Working Example 2

Silicone particles were obtained in a similar manner as working example 1, except that 0.4 g of a cationized cellulose (product name: POIZ C-60H by Kao Corporation) (amount equivalent to 0.05 parts by mass per 100 parts by mass of water) was used instead of 1 g of the 40% dimethyldiallylammonium chloride polymer aqueous solution (product name: ME polymer H40W by TOHO Chemical Industry Co., Ltd.).

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

These silicone particles were observed with an electronic microscope, and it was confirmed that they were particles with the surfaces of the silicone elastomer spherical particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.006 mol/100 g.

Working Example 3

Silicone particles were obtained in a similar manner as working example 1, except that 1.3 g of a 30% dodecyltrimethylammonium chloride (product name: Cation BB by NOF CORPORATION) (amount at which dodecyltrimethylammonium chloride would be present in an amount of 0.05 parts by mass per 100 parts by mass of water) was used instead of 1 g of the 40% dimethyldiallylammonium chloride polymer aqueous solution (product name: ME polymer H40W by TOHO Chemical Industry Co., Ltd.).

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

These silicone particles were observed with an electronic microscope, and it was confirmed that they were particles with the surfaces of the silicone elastomer spherical fine particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.006 mol/100 g.

Working Example 4

Silicone particles were obtained in a similar manner as working example 1, except that 1.3 g of a 30% polyethylenimine (product name: EPOMIN P-1000 by NIPPON SHOKUBAI CO., LTD.) (amount at which polyethylenimine would be present in an amount of 0.05 parts by mass per 100 parts by mass of water) was used instead of 1 g of the 40% dimethyldiallylammonium chloride polymer aqueous solution (product name: ME polymer H40W by TOHO Chemical Industry Co., Ltd.).

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

These silicone particles were observed with an electronic microscope, and it was confirmed that they were particles with the surfaces of the silicone elastomer spherical particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.006 mol/100 g.

Working Example 5

Silicone particles were obtained in a similar manner as working example 1, except that 0.5 g of a 75% dialkyl (12 to 18 carbons) dimethyl ammonium chloride (product name: QUARTAMIN D2345P by Kao Corporation) (amount at which dialkyl (12 to 18 carbons) dimethyl ammonium chloride would be present in an amount of 0.05 parts by mass per 100 parts by mass of water) was used instead of 1 g of the 40% dimethyldiallylammonium chloride polymer aqueous solution (product name: ME polymer H40W by TOHO Chemical Industry Co., Ltd.).

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

These silicone particles were observed with an electronic microscope, and it was confirmed that they were fine particles with the surfaces of the silicone elastomer spherical fine particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.006 mol/100 g.

Working Example 6

Silicone particles were obtained in a similar manner as working example 1, except that 2 g of a 20% tripolyoxyethylene stearyl ammonium chloride (product name: Catinal SPC-20AC by TOHO Chemical Industry Co., Ltd.) (amount at which tripolyoxyethylene stearyl ammonium chloride would be present in an amount of 0.05 parts by mass per 100 parts by mass of water) was used instead of 1 g of the 40% dimethyldiallylammonium chloride polymer aqueous solution (product name: ME polymer H40W by TOHO Chemical Industry Co., Ltd.).

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

Further, these silicone particles were observed with an electronic microscope, and it was confirmed that they were particles with the surfaces of the silicone elastomer spherical fine particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.006 mol/100 g.

Working Example 7

Here, 288 g of the aqueous dispersion of the silicone elastomer spherical particles that had been obtained in working example 1, was moved to a 2 L glass flask equipped with a stirring device utilizing an anchor-shaped stirring blade(s), followed by adding thereto 672 g of water, 19 g of a 28% ammonia water, and 1 g of the 40% dimethyldiallylammonium chloride polymer aqueous solution (product name: ME polymer H40W by TOHO Chemical Industry Co., Ltd.) (amount at which the dimethyldiallylammonium chloride polymer would be present in an amount of 0.05 parts by mass per 100 parts by mass of water). The liquid at that time exhibited a pH of 11.3. After being subjected to a temperature control of 5 to 10° C., 15.8 g of methyltrimethoxysilane and 4.3 g of vinyltrimethoxysilane (amounts at which polymethylvinylsilsesquioxane after hydrolysis and condensation reaction would be present in an amount of 6.7 parts by mass per 100 parts by mass of the silicone elastomer spherical particles; and molar ratio between methyltrimethoxysilane and vinyltrimethoxysilane is 80:20) were further delivered thereinto by drops over a period of 25 min. The liquid temperature was kept at 5 to 10° C. during such period, and stirring was then performed for another hour. Next, heating was performed until a temperature of 55 to 60° C. had been reached, and stirring was then performed for an hour while maintaining such temperature.

In this way, the hydrolysis and condensation reaction of methyltrimethoxysilane and vinyltrimethoxysilane was completed.

The liquid prepared by hydrolyzing and condensing methyltrimethoxysilane in the aqueous dispersion was dehydrated to about 30% moisture content using a pressure filter. The dehydration product was then moved to a 2 L glass flask equipped with a stirring device utilizing an anchor-shaped stirring blade(s), followed by adding 1,000 g of water thereto, and then stirring them for 30 min before performing dehydration using a pressure filter. The dehydration product obtained was again moved to a 2 L glass flask equipped with a stirring device utilizing an anchor-shaped stirring blade(s), followed by adding 1,000 g of water thereto, and then stirring them for another 30 min before performing dehydration using a pressure filter. The dehydration product obtained was then dried at a temperature of 105° C. in a hot air-flow dryer, followed by using a jet mill to crush the dried product to obtain fluid silicone particles.

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

These silicone particles were observed with an electronic microscope, and it was confirmed that they were particles with the surfaces of the silicone elastomer spherical particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.003 mol/100 g.

Working Example 8

Put into a 5 L glass beaker were 525 g of a methylvinylpolysiloxane that is represented by the following formula (7) and has a kinetic viscosity of 65 $mm^2/s$; and 75 g of a methylhydrogenpolysiloxane that is represented by the above formula (6) and has a kinetic viscosity of 27 $mm^2/s$ (amounts at which 1.16 hydrosilyl groups would be present per one olefinic unsaturated group), followed by using a homomixer to stir and melt them at 2,000 rpm. Next, 3.8 g of a polyoxyethylene cetyl ether (adduct molar number of ethylene oxide=10 mol) and 100 g of water were added thereto, followed by using a homomixer to stir them at 6,000 rpm to obtain an oil-in-water type emulsion with an increased viscosity. There, stirring was further continued for 15 min. Next, as a result of adding water of 4,294 g while performing stirring at 2,000 rpm, and then using a homogenizer to once perform homogenization at a pressure of 100 MPa, a homogenous white emulsion was obtained. This emulsion was then moved to a 5 L glass flask equipped with a stirring device utilizing an anchor-shaped stirring blade(s), and subjected to a temperature control of 15 to 20° C. Next, while performing stirring, there was added a mixed melt of: 1.2 g of a toluene solution of a complex of chloroplatinic acid and a vinyl group-containing disiloxane (platinum content 0.5%); and 1.2 g of polyoxyethylene lauryl ether (adduct molar number of ethylene oxide=9 mol), followed by further performing stirring at the same temperature for 12 hours to obtain an aqueous dispersion of silicone elastomer particles.

[Chemical formula 4]

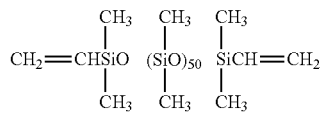

(7)

After using an optical microscope to observe the shapes of the silicone elastomer particles in the aqueous dispersion obtained, it was confirmed that they were in spherical shapes, and exhibited a volume average particle size of 2 μm when measured by an electric resistance-method particle size distribution measuring device (Multisizer 3 by Beckman Coulter, Inc.).

Further, the hardness of the silicone elastomer composing the silicone elastomer particles was measured as follows. The methylvinylpolysiloxane represented by the formula (7), the methylhydrogenpolysiloxane represented by the formula (6) and the toluene solution of the complex of chloroplatinic acid and the vinyl group-containing disiloxane (platinum content 0.5%), were mixed at the aforementioned compounding ratio, followed by pouring them into an aluminum petri dish in a way such that the mixture would reach a thickness of 10 mm. After being left at 25° C. for 24 hours, the mixture was then heated in a constant-temperature bath of 50° C. for an hour, thus obtaining a non-sticky silicone elastomer. The hardness of the silicone elastomer was 50 when measured by a type-A durometer as a hardness meter.

Next, 917 g of the obtained aqueous dispersion of the silicone elastomer spherical particles was moved to a 2 L glass flask equipped with a stirring device utilizing an anchor-shaped stirring blade(s), followed by adding thereto 42 g of water, 20 g of a 28% ammonia water, and 1.1 g of the 40% dimethyldiallylammonium chloride polymer aqueous solution (product name: ME polymer H40W by TOHO Chemical Industry Co., Ltd.) (amount at which the dimethyldiallylammonium chloride polymer would be present in an amount of 0.05 parts by mass per 100 parts by mass of water). The liquid at that time exhibited a pH of 11.4. After being subjected to a temperature control of 5 to 10° C., 9.5 g of methyltrimethoxysilane and 10.4 g of vinyltrimethoxysilane (amounts at which polymethylvinylsilsesquioxane after hydrolysis and condensation reaction would be present in an amount of 9.3 parts by mass per 100 parts by mass of the silicone elastomer spherical particles; and molar ratio between methyltrimethoxysilane and vinyltrimethoxysilane is 50:50) were further delivered thereinto by drops over a period of 20 min. The liquid temperature was kept at 5 to 10° C. during such period, and stirring was then performed for another hour. Next, heating was performed until a temperature of 55 to 60° C. had been reached, and stirring was then performed for an hour while maintaining such temperature. In this way, the hydrolysis and condensation reaction of methyltrimethoxysilane and vinyltrimethoxysilane was completed.

The liquid prepared by hydrolyzing and condensing methyltrimethoxysilane in the aqueous dispersion was dehydrated to about 30% moisture content using a pressure filter. The dehydration product was then moved to a 2 L glass flask equipped with a stirring device utilizing an anchor-shaped stirring blade(s), followed by adding 1,000 g of water thereto, and then stirring them for 30 min before performing dehydration using a pressure filter. The dehydration product obtained was again moved to a 2 L glass flask equipped with a stirring device utilizing an anchor-shaped stirring blade(s), followed by adding 1,000 g of water thereto, and then stirring them for another 30 min before performing dehydration using a pressure filter. The dehydration product obtained was then dried at a temperature of 105° C. in a hot air-flow dryer, followed by using a jet mill to crush the dried product to obtain fluid silicone particles.

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 2 μm.

These silicone particles were observed with an electronic microscope, and it was confirmed that they were particles with the surfaces of the silicone elastomer spherical particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.007 mol/100 g.

Working Example 9

Here, 917 g of the aqueous dispersion of the silicone elastomer spherical particles that had been obtained in working example 8, was moved to a 2 L glass flask equipped with a stirring device utilizing an anchor-shaped stirring blade(s), followed by adding thereto 41 g of water, 20 g of a 28% ammonia water, and 1.1 g of the 40% dimethyldiallylammonium chloride polymer aqueous solution (product name: ME polymer H40W by TOHO Chemical Industry Co., Ltd.) (amount at which the dimethyldiallylammonium chloride polymer would be present in an amount of 0.05 parts by mass per 100 parts by mass of water). The liquid at that time exhibited a pH of 11.4. After being subjected to a temperature control of 5 to 10° C., 18.3 g of methyltrimethoxysilane and 2.2 g of vinyltrimethoxysilane (amounts at which polymethylvinylsilsesquioxane after hydrolysis and condensation reaction would be present in an amount of 9.3 parts by mass per 100 parts by mass of the silicone elastomer spherical particles; and molar ratio between methyltrimethoxysilane and vinyltrimethoxysilane is 90:10) were further delivered thereinto by drops over a period of 20 min. The liquid temperature was kept at 5 to 10° C. during such period, and stirring was then performed for another hour. Next, heating was performed until a temperature of 55 to 60° C. had been reached, and stirring was then performed for an hour while maintaining such temperature. In this way, the hydrolysis and condensation reaction of methyltrimethoxysilane and vinyltrimethoxysilane was completed.

The liquid prepared by hydrolyzing and condensing methyltrimethoxysilane in the aqueous dispersion was dehydrated to about 30% moisture content using a pressure filter. The dehydration product was then moved to a 2 L glass flask equipped with a stirring device utilizing an anchor-shaped stirring blade(s), followed by adding 1,000 g of water thereto, and then stirring them for 30 min before performing dehydration using a pressure filter. The dehydration product obtained was again moved to a 2 L glass flask equipped with a stirring device utilizing an anchor-shaped stirring blade(s), followed by adding 1,000 g of water thereto, and then stirring them for another 30 min before performing dehydration using a pressure filter. The dehydration product obtained was then dried at a temperature of 105° C. in a hot air-flow dryer, followed by using a jet mill to crush the dried product to obtain fluid silicone particles.

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 2 μm.

These silicone particles were observed with an electronic microscope, and it was confirmed that they were particles with the surfaces of the silicone elastomer spherical particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.003 mol/100 g.

Working Example 10

Silicone particles were obtained in a similar manner as working example 1, except that the amount of the 40% dimethyldiallylammonium chloride polymer aqueous solution (product name: ME polymer H40W by TOHO Chemical Industry Co., Ltd.) was changed from 1 g to 0.4 g.

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

These silicone particles were observed with an electronic microscope, and it was confirmed that they were particles with the surfaces of the silicone elastomer spherical particles being coated with granular polymethylvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.005 mol/100 g.

Comparative Example 1

Silicone particles were obtained in a similar manner as working example 1, except that the 40% dimethyldiallylammonium chloride polymer aqueous solution (product name: ME polymer H40W by TOHO Chemical Industry Co., Ltd.) was not used.

The silicone fine particles obtained were then dispersed in water using a surfactant, and the electric resistance-method particle size distribution measuring device (Multisizer 3 by Beckman Coulter, Inc.) was used to measure the particle size distribution of the silicone particles. As a result, the particle size distribution thereof was at the same level as that of the abovementioned aqueous dispersion of the silicone elastomer particles, and the volume average particle size thereof was 5 μm.

These silicone particles were observed with an electronic microscope, and it was confirmed that they were particles with the surfaces of the silicone elastomer spherical particles being coated with granular polymethylvinylsilsesquioxane. The aforementioned method was employed to study the non-cohesiveness of these silicone particles, and the results shown in Table 1 were obtained.

The vinyl group content in these silicone particles was measured by the aforementioned method, and it was confirmed that the vinyl group content was less than 0.001 mol/100 g.

Comparative Example 2

Here, 288 g of the aqueous dispersion of the silicone elastomer spherical particles that had been obtained in working example 1, was moved to a 2 L glass flask equipped with a stirring device utilizing an anchor-shaped stirring blade(s), followed by adding thereto 672 g of water, 19 g of a 28% ammonia water, and 1 g of the 40% dimethyldiallylammonium chloride polymer aqueous solution (product name: ME polymer H40W by TOHO Chemical Industry Co., Ltd.) (amount at which the dimethyldiallylammonium chloride polymer would be present in an amount of 0.05 parts by mass per 100 parts by mass of water). The liquid at that time exhibited a pH of 11.3. After being subjected to a temperature control of 5 to 10° C. 15.8 g of methyltrimethoxysilane and 4.3 g of vinyltrimethoxysilane (amounts at which polymethylvinylsilsesquioxane after hydrolysis and condensation reaction would be present in an amount of 6.7 parts by mass per 100 parts by mass of the silicone elastomer spherical particles; and molar ratio between methyltrimethoxysilane and vinyltrimethoxysilane is 80:20) were further delivered thereinto by drops over a period of 25 min. The liquid temperature was kept at 5 to 10° C. during such period, and stirring was then performed for another hour. Next, heating was performed until a temperature of 55 to 60° C. had been reached, and stirring was then performed for an hour while maintaining such temperature. In this way, the hydrolysis and condensation reaction of methyltrimethoxysilane and vinyltrimethoxysilane was completed.

The liquid prepared by hydrolyzing and condensing methyltrimethoxysilane in the aqueous dispersion was dehydrated to about 30% moisture content using a pressure filter. The dehydration product was then moved to a 2 L glass flask equipped with a stirring device utilizing an anchor-shaped stirring blade(s), followed by adding 1,000 g of water thereto, and then stirring them for 30 min before performing dehydration using a pressure filter. The dehydration product obtained was again moved to a 2 L glass flask equipped with a stirring device utilizing an anchor-shaped stirring blade(s), followed by adding 1,000 g of water thereto, and then stirring them for another 30 min before performing dehydration using a pressure filter. The dehydration product obtained was then dried at a temperature of 105° C. in a hot air-flow dryer, followed by using a jet mill to crush the dried product to obtain silicone particles.

The silicone particles obtained were then dispersed in water using a surfactant, and the electric resistance-method particle size distribution measuring device (Multisizer 3 by Beckman Coulter, Inc.) was used to measure the particle size distribution of the silicone particles. As a result, many of the particle sizes observed were larger than those in the above-mentioned aqueous dispersion of the silicone elastomer particles, and the volume average particle size thereof was 6 µm.

These silicone particles were observed with an electronic microscope, and it was confirmed that they were particles with the surfaces of the silicone elastomer spherical particles being coated with granular polyvinylsilsesquioxane.

The aforementioned method was employed to study the non-cohesiveness of these silicone particles, and the results shown in Table 1 were obtained.

The vinyl group content in these silicone particles was measured by the aforementioned method, and it was confirmed that the vinyl group content was 0.007 mol/100 g.

esquioxane. However, it is assumed that the particles of comparative example 2 exhibited a high cohesiveness, and a poor dispersibility to a base material.

The invention claimed is:

1. Silicone particles as silicone elastomer spherical particles having surfaces thereof coated with polymethylalkenylsilsesquioxane, and having a volume average particle size of 0.1 to 100 wherein
   the polymethylalkenylsilsesquioxane is in an amount of 0.5 to 25 parts by mass per 100 parts by mass of the silicone elastomer spherical particles, and alkenylsilyl groups are present on the surface of the polymethylalkenylsilsesquioxane in an amount of not smaller than 0.001 mol/100 g.

TABLE 1

| Item | Cationic surfactant or Cationic water-soluble polymer | | Methyltrimethoxysilane: Vinyltrimethoxysilane (Molar ratio) | Average particle size of silicone particles µm | Dispersibility (Mesh passing amount %) | | | Vinyl group content mol/ 100 g |
|---|---|---|---|---|---|---|---|---|
| | Chemical name | Amount g/Water 100 g | | | 60 mesh | 100 mesh | 200 mesh | |
| Working example 1 | Dimethyldiallyl ammonium chloride polymer | 0.05 | 50:50 | 5 | 96 | 85 | 82 | 0.006 |
| Working example 2 | Cationized cellulose | 0.05 | 50:50 | 5 | 98 | 85 | 78 | 0.006 |
| Working example 3 | Dodecyltrimethyl ammonium chloride | 0.05 | 50:50 | 5 | 98 | 83 | 76 | 0.006 |
| Working example 4 | Polyethylenimine | 0.05 | 50:50 | 5 | 98 | 83 | 80 | 0.006 |
| Working example 5 | Dialkyldimethyl ammonium chloride | 0.05 | 50:50 | 5 | 98 | 82 | 75 | 0.006 |
| Working example 6 | Tripolyoxyethylene stearyl ammonium chloride | 0.05 | 50:50 | 5 | 96 | 84 | 66 | 0.006 |
| Working example 7 | Dimethyldiallyl ammonium chloride polymer | 0.05 | 80:20 | 5 | 99 | 94 | 92 | 0.003 |
| Working example 8 | Dimethyldiallyl ammonium chloride polymer | 0.05 | 50:50 | 2 | 98 | 91 | 58 | 0.007 |
| Working example 9 | Dimethyldiallyl ammonium chloride polymer | 0.05 | 90:10 | 2 | 92 | 61 | 49 | 0.003 |
| Working example 10 | Dimethyldiallyl ammonium chloride polymer | 0.02 | 50:50 | 5 | 98 | 94 | 92 | 0.005 |
| Comparative example 1 | — | 0 | 50:50 | 5 | 94 | 81 | 76 | <0.001 |
| Comparative example 2 | Dimethyldiallyl ammonium chloride polymer | 0.05 | 0:100 | 6 | 23 | 0 | 0 | 0.007 |

The silicone fine particles of working examples 1 to 10 are such that methyltrimethoxysilane and vinyltrimethoxysilane are to be hydrolyzed and condensed under the presence of a cationic surfactant and/or a cationic water-soluble polymer, where the surfaces of the silicone elastomer spherical particles are then coated with polymethylvinylsilsesquioxane. In this case, vinylsilyl groups are present on the surface of polymethyl vinylsilsesquioxane.

Comparative example 1 did not use a cationic surfactant and/or a cationic water-soluble polymer, and no vinylsilyl group was observed on the surface of the polymethylvinylsilsesquioxane. Comparative example 2 is such that the surfaces of the silicone elastomer spherical particles were coated with polyvinylsilsesquioxane, and that vinylsilyl groups are thereby present on the surface of polyvinylsils- 2. The silicone particles according to claim 1, wherein the polymethylalkenylsilsesquioxane is polymethylvinylsilsesquioxane.

3. A method for producing the silicone particles as set forth in claim 1, comprising:
   coating the surfaces of silicone elastomer spherical particles with polymethylalkenylsilsesquioxane, by hydrolyzing and condensing methyltrimethoxysilane and alkenyl trimethoxysilane under the presence of: water; the silicone elastomer spherical particles having a volume average particle size of 0.1 to 100 µm; an alkaline substance; and a cationic surfactant and/or a cationic water-soluble polymer.

4. The method for producing the silicone particles according to claim 3, wherein an amount of the cationic surfactant and/or the cationic water-soluble polymer used is 0.001 to 1 parts by mass per 100 parts by mass of water.

* * * * *